(12) United States Patent
Kobayashi

(10) Patent No.: US 6,738,047 B2
(45) Date of Patent: May 18, 2004

(54) HOME PAGE DISPLAY AND DATA TRANSMITTER

(75) Inventor: Hideo Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 180 days.

(21) Appl. No.: 09/795,737

(22) Filed: Feb. 28, 2001

(65) Prior Publication Data

US 2001/0017616 A1 Aug. 30, 2001

(30) Foreign Application Priority Data

Feb. 28, 2000 (JP) .................................. 2000-001051 U

(51) Int. Cl.[7] .................................................. G09G 5/00
(52) U.S. Cl. ...................................... 345/172; 345/169
(58) Field of Search ................................. 345/172–173, 345/158, 168, 169; 340/81

(56) References Cited

U.S. PATENT DOCUMENTS

| | | | | |
|---|---|---|---|---|
| 4,359,222 A | * | 11/1982 | Smith et al. .................. | 463/31 |
| 4,639,225 A | * | 1/1987 | Washizuka .................. | 434/308 |
| 4,890,832 A | * | 1/1990 | Komaki ........................ | 463/44 |
| 5,379,057 A | * | 1/1995 | Clough et al. ............... | 345/173 |
| 5,461,222 A | * | 10/1995 | Haneda ....................... | 235/492 |
| 5,483,261 A | * | 1/1996 | Yasutake .................... | 345/173 |
| 5,661,635 A | * | 8/1997 | Huffman et al. ............. | 361/684 |
| 5,914,707 A | * | 6/1999 | Kono .......................... | 345/173 |
| 5,987,612 A | * | 11/1999 | Takagawa et al. .......... | 713/201 |

FOREIGN PATENT DOCUMENTS

| | | | | |
|---|---|---|---|---|
| JP | 59123986 A | * | 7/1984 | .......... G06K/15/02 |
| JP | 60246469 A | * | 12/1985 | ........... G06F/15/02 |
| JP | 3-120918 | | 5/1991 | |
| JP | 4-88547 | | 3/1992 | |
| JP | 5-28112 | | 2/1993 | |
| JP | 5-189624 | | 7/1993 | |
| JP | 11-288397 | | 10/1999 | |
| JP | 11288397 A | * | 10/1999 | ........... G06F/13/00 |
| JP | 2000020439 A | * | 1/2000 | ........... G06F/13/00 |

* cited by examiner

Primary Examiner—Michael Moyer
(74) Attorney, Agent, or Firm—Rosenthal & Osha L.L.P.

(57) ABSTRACT

To save trouble in replacing cards and to facilitate the operation of a key on a home page, a home page display system according to the invention includes terminal equipment connected to the Internet, a remote control that transmits data to the terminal equipment, an IC card installed in the remote control and a TV monitor on which a home page corresponding to the IC card is displayed. The remote control is provided with a transparent tablet and when the IC card is set, a key control panel printed on the surface of the card appears in the part of the tablet. A program for allocating each key on the tablet corresponding to a home page is stored in the IC card.

6 Claims, 7 Drawing Sheets

FIG. 5
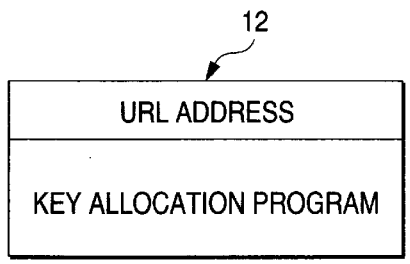
FIG. 6A
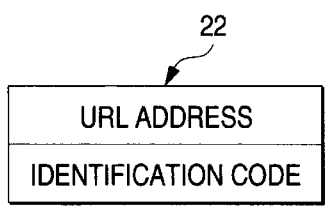
FIG. 6B
| IDENTIFICATION CODE 001 | PROGRAM (1) |
| IDENTIFICATION CODE 002 | PROGRAM (2) |
| IDENTIFICATION CODE 003 | PROGRAM (3) |
| ⋮ | ⋮ |
FIG. 7
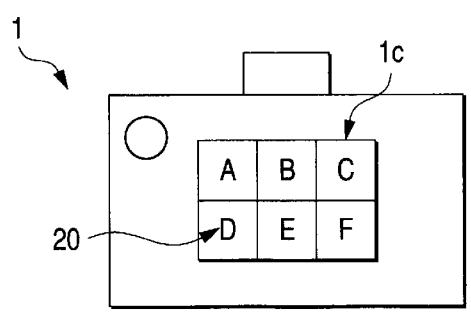

FIG. 9
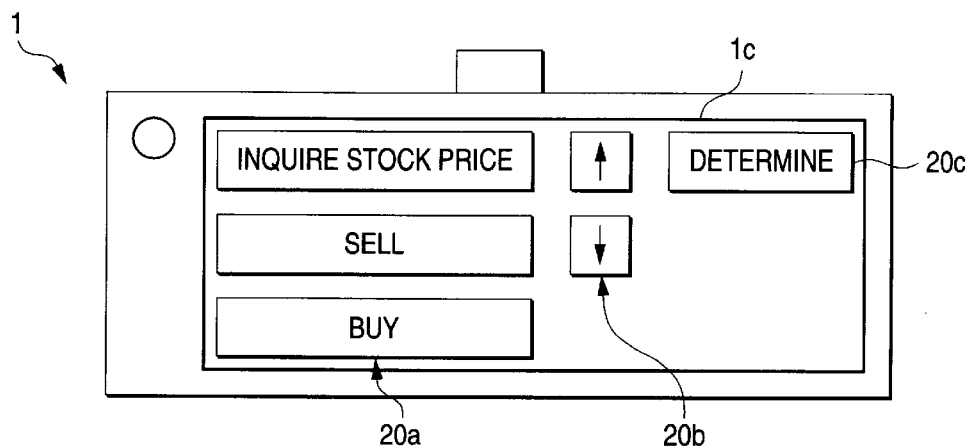
FIG. 10A
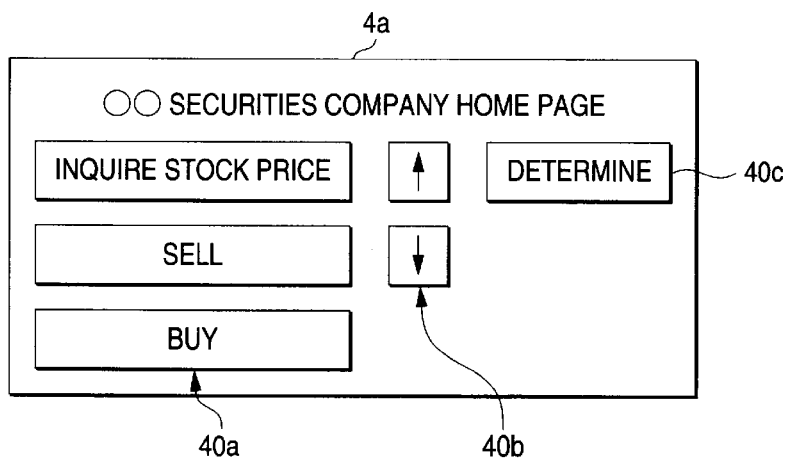
FIG. 10B

US 6,738,047 B2

HOME PAGE DISPLAY AND DATA TRANSMITTER

BACKGROUND OF THE INVENTION

The present invention relates to a system for displaying a home page of the Internet by remote control and also relates to a data transmitter used in the system.

A system for displaying a home page of the Internet utilizing not only a personal computer but a domestic television set (hereinafter called a TV set) owing to the rapid population of the Internet is realized. Such a system is composed of a set-top box (STB) which is terminal equipment connected to the Internet, a remote control transmitter (hereinafter called a remote control) that transmits data to the STB by remote control, a TV monitor connected to the STB that displays a predetermined home page and a card where information to access to the server of the home page is recorded.

In such a system, to view a home page on a TV monitor, first, a card prepared corresponding to a home page to be viewed is inserted into a card slot of the STB. A uniform resource locator (URL) of a specific home page corresponding to the card is recorded in the card and is read by a card reader built in the STB. The STB accesses to a server of URL read from the card via the Internet, acquires the information of the home page from the server and displays it on the TV monitor. When the home page is displayed on the TV monitor, a cursor on the screen can be moved, a desired item can be selected and pages can be switched by transmitting a signal to the STB by remote control.

As connection to a server is enabled and a home page is displayed only by inserting a card to the STB according to the system, a viewer can realize the Internet easily without complex operation.

However, in case a home page currently viewed is to be closed and another home page is to be opened, the conventional type system has a problem that a viewer is required to go to a place where the STB is installed so as to pull a card and to install a card corresponding to a new home page to be viewed and the replacement of cards is troublesome.

There is also a problem that as an item is selected and pages are switched by moving a cursor on the screen by remote control after a home page is displayed, it takes much time for those who are unaccustomed to remote control to operate and wrong operation is performed.

In the Unexamined Japanese Patent Application Publication No. Hei 5-189624 which is prior art, electronic equipment that marks different in a position every type of a card are formed on the surface of a memory card and the type of the card can be discriminated by pressing the surface of a transparent touch panel opposite to the marks when the card is installed is disclosed. However, in the patent application, as means for discriminating the type of a card is merely disclosed and a home page corresponding to a card cannot be displayed by remote control though it is able in this specification, the problems are not solved.

Also, in the Unexamined Japanese Patent Application Publication No. Hei 3-120918, an IC card system provided with a communication facility wherein a message is written on a tablet provided to an IC card by an input pen, is sent to another IC card by radio and is displayed on a tablet of the IC card on the receive side is disclosed. However, as in the IC card system in the patent application, a home page corresponding to a card cannot be also displayed by remote control though it is able in this specification, information to be sent is required to be written by an input pen and the operation is troublesome, the problems are not solved.

SUMMARY OF THE INVENTION

Therefore, the object of the invention is to enable a desired home page to be easily displayed by remote control without going to a place where terminal equipment is installed in a system that displays a home page of the Internet by remote control.

Another object of the invention is to enable prompt and easy operation such as the selection of an item on a displayed home page.

Another object of the invention is to provide a system which does not require much capacity of a memory on the side of a data transmitter.

Another object of the invention is to provide a system which does not require much capacity of a memory on the side of a card.

Another object of the invention is to enable easier and securer operation for selecting an item on a displayed home page.

The other object of the invention is to enable customizing a data transmitter every installed card to utilize as a data transmitter dedicated to a home page corresponding to a card.

A home page display system according to the invention is provided with terminal equipment connected to the Internet, a data transmitter that transmits data to the terminal equipment by remote control, an information storage medium installed in the data transmitter so that the information storage medium can be detached and a display that displays a home page based upon data which the terminal equipment receives from the data transmitter, and plural marks showing a key control panel are provided on the surface of the information storage medium. Information for specifying a specific home page displayed on the display and information for allocating the plural marks as a key corresponding to the home page are also stored in the information storage medium. In the mean time, the data transmitter is provided with a transparent tablet on which the marks attached to the information storage medium appear as a key control panel. The data transmitter reads information stored in the information storage medium, allocates the marks that appear on the tablet as a key corresponding to a specific home page, transmits the URL address of the specific home page to the terminal equipment and transmits a key code corresponding to an operated key.

According to such a system, as the data transmitter reads information from the information storage medium and transmits the data to the terminal equipment, access to equipment having a URL address corresponding to a card is enabled by replacing cards inserted into the data transmitter. Therefore, a desired home page can be opened only by operation in hand and the trouble of being required to go to the location of the terminal equipment every time cards are to be replaced is solved.

As the marks of the information storage medium that appear on the tablet of the data transmitter are allocated as a key corresponding to a specific home page, correspondence between the displayed contents of a home page and the key control panel of the data transmitter becomes simple and a desired item can be easily selected.

In the invention, for the information storage medium, an IC card on the surface of which marks showing the key control panel are printed can be used. As the IC card includes a memory the capacity of which is by far larger, compared with the capacity of a memory included in a magnetic card, a program for allocating the marks as a key control panel corresponding to a specific home page can be storage in the memory and hereby, a large capacity memory is not required on the side of the data transmitter.

In the invention, in case the memory of the data transmitter can still store data, the program can be also stored corresponding to each card on the side of the data transmitter. In this case, an identification code corresponding to a specific home page is stored in the information storage medium, the data transmitter reads this identification code, reads a program corresponding to the identification code from the memory and the allocation of the key control panel has only to be performed. Hereby, as a program is not required to be stored in the information storage medium, the system can be also composed using a magnetic card the storage capacity of which is small.

Also, in a preferred embodiment of the invention, the display mode of the key control panel that appears on the tablet of the data transmitter and the display mode of the key control panel for a home page displayed on the display are the same. Hereby, in case a user wants to select a key displayed on a home page, he/she has only to operate the same key as the key on the tablet of the data transmitter and can select the item on the home page extremely easily and correctly. Also, as a cursor is not required to be moved for selection, even a beginner can operate promptly.

Next, a data transmitter according to the invention is a data transmitter in a remote control system used in the home page display system and is provided with a slot into which an information storage medium is inserted, a transparent tablet on which marks on the surface of the information storage medium inserted into the slot appear as a key control panel and a reader for reading information recorded in the information storage medium. Further, the data transmitter is provided with means for allocating the marks that appear on the tablet as a key control panel corresponding to a specific home page based upon information read by the reader and a transmitter that transmits the URL address of the specific home page and transmits a key code corresponding to an operated key.

As the key control panel is formed on the tablet by the marks of the information storage medium and a key on the key control panel is allocated as a key corresponding to a home page specified by the information storage medium, the data transmitter composed as described above is customized every card and can be utilized for a data transmitter dedicated to a home page corresponding to each card.

BRIEF DESCRIPTION OF THE DRAWINGS

FIG. 5 is a table showing contents stored in a memory of the IC card;

FIGS. 6A and 6B are tables in another embodiment;

FIG. 7 is a plan showing a remote control in which an IC card is set;

FIG. 9 is a plan showing a remote control in another embodiment;

FIGS. 10A and 10B show examples of a display screen in another embodiment;

DETAILED DESCRIPTION OF THE PREFERRED EMBODIMENTS

Figure 1:
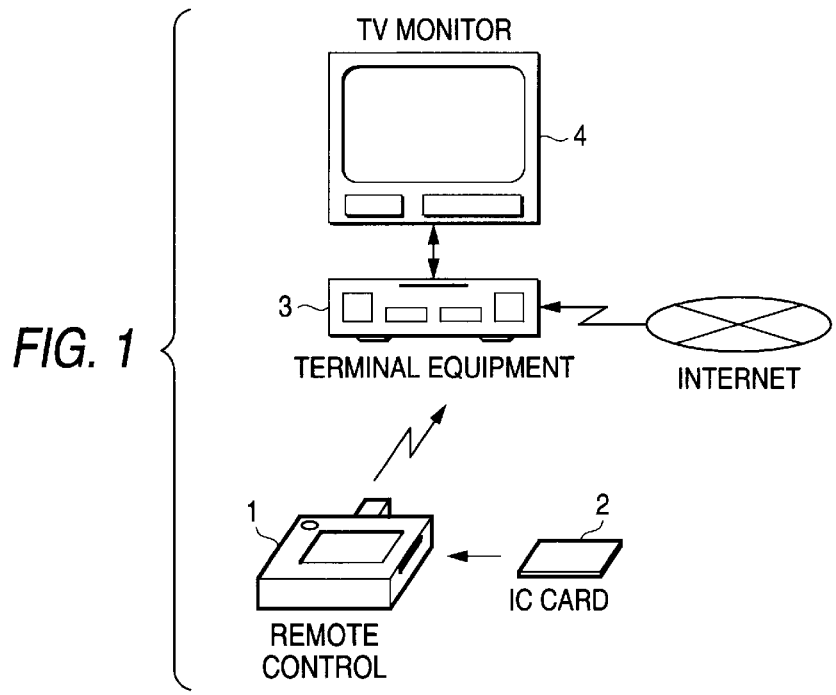
FIG. 1 shows the outline configuration of a home page display system according to the invention.

Referring to the drawings, embodiments of the invention will be described below. FIG. 1 shows the outline configuration of a home page display system according to the invention. As shown in FIG. 1, a reference number 1 denotes a remote control composing a data transmitter, 2 denotes an IC card as an information storage medium installed in the remote control 1 so that the IC card can be detached, 3 denotes terminal equipment such as STB connected to the Internet and 4 denotes a TV monitor as a display connected to the terminal equipment 3.

As described in detail later, the remote control 1 transmits a signal to the terminal equipment 3 based upon information stored in the IC card 2, when the terminal equipment 3 receives this signal, it accesses to a predetermined server via the Internet, acquires information of a home page from the server and displays this on the TV monitor 4.

Figure 2A:
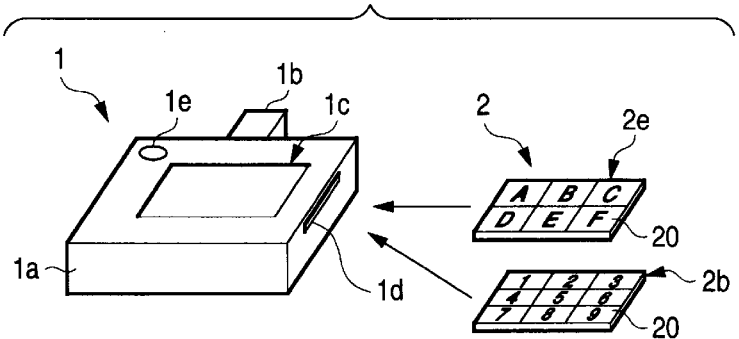
FIGS. 2A to 2C are outside drawings showing a concrete example of a remote control and an IC card.

FIG. 2 are outside drawings showing concrete examples of the remote control 1 and the IC card 2. As shown in FIG. 2A, a reference number 1a denotes the body of the remote control 1, 1b denotes a remote control transmitter for transmitting data, 1c denotes a transparent tablet provided on the upper surface of the body 1a, 1d denotes a slot of the IC card 2 provided on the side of the body 1a and 1e denotes a power switch provided on the upper surface of the body 1a.

The body 1a is composed by a box-type housing and each block described later is built inside. Infrared rays and an electric wave are transmitted forward from the remote control transmitter 1b. The tablet 1c is composed by a well-known transparent touch panel, for example, is provided a detector composed of a resistive film (not shown), the resistance value of a pressed part varies when the detector is pressed and a detection signal is output. The slot id is formed as a slit fitted to the dimension of the IC card 2. The power switch 1e is composed of a push button switch for example.

Plural marks 20 showing a key control panel are printed on the surface of the IC card 2. An IC card 2a is a card on which marks 20 including letters A to F are printed and an IC card 2b is a card on which marks 20 including numerals 1 to 9 are printed. For the marks 20, a graphic form and a symbol may be also used in addition to such letters and numerals.

Figure 2B:
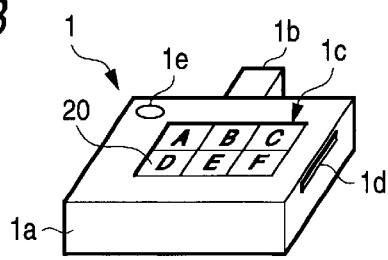

FIG. 2B shows a state in which the IC card 2a shown in FIG. 2A is inserted into the slot 1d of the body 1a and is set in the remote control 1. In this state, the letters 20 printed on the surface of the IC card 2a are visible via the transparent tablet 1c. Each letter of A to F corresponds to one key and a key control panel composed of six keys is formed.

Figure 2C:
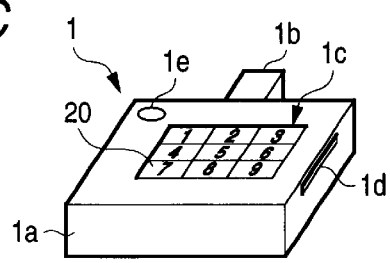

FIG. 2C shows a state in which the IC card 2b shown in FIG. 2A is inserted into the slot 1d of the body 1a and is set in the remote control 1. In this case, numerals 20 printed on the surface of the IC card 2b are also visible via the transparent tablet 1c, each numeral of 1 to 9 corresponds to one key and a key control panel composed of nine keys is formed.

The marks 20 printed on the surface of the card appear on the tablet 1c as the key control panel by installing the IC card 2 in the remote control 1 as described above. A code signal corresponding to a pressed key is transmitted from the remote control transmitter 1b by pressing a predetermined mark 20 of the key control panel from over the tablet 1c. For example, when a part of the letter D on the tablet 1c is pressed in FIG. 2B, a code signal corresponding to a key of D is transmitted, and when a part of the numeral 3 on the tablet 1c is pressed in FIG. 2C, a code signal corresponding to a key of 3 is transmitted. As described above, a signal according to any of the marks 20 printed on the installed card is transmitted from the remote control 1, however, the allocation of each key of the key control panel that appears on the tablet 1c is executed according to a program recorded in the IC card 2. The details will be described later.

Figure 3A:
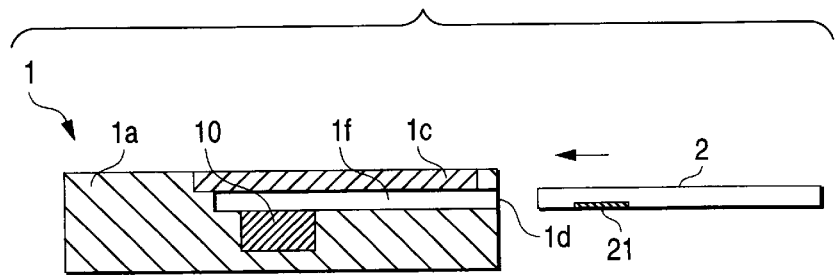
FIGS. 3A and 3B are sectional views showing the internal configuration of the remote control.
Figure 3B:
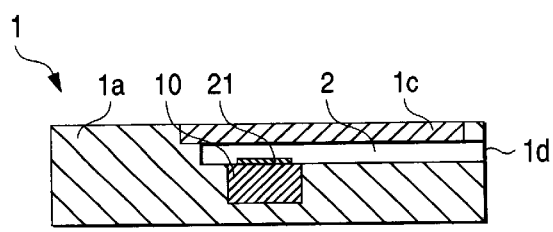

FIG. 3 are sectional views showing the internal structure of the remote control 1, FIG. 3A shows a state before the IC card 2 is installed and FIG. 3B shows a state in which the IC card 2 is installed. A reference number 1a denotes the body, 1c denotes the transparent tablet, 1d denotes the slot of a card and these are as described in relation to FIG. 2. A reference number 1f denotes a housing of a card connected to the slot 1d, the IC card 2 inserted from a direction shown by an arrow in FIG. 3A is housed in this housing 1f, is set in a position under the tablet 1c as shown in FIG. 3B and in this state, the marks 20 printed on the surface of the IC card 2 are visible via the tablet 1c as shown in FIGS. 2B and 2C. A reference number 10 denotes an IC card reader and the IC card reader is composed by well-known structure provided with a contact (not shown) which comes in contact with a terminal (not shown) of a chip 21 built in the IC card 2.

Figure 4:
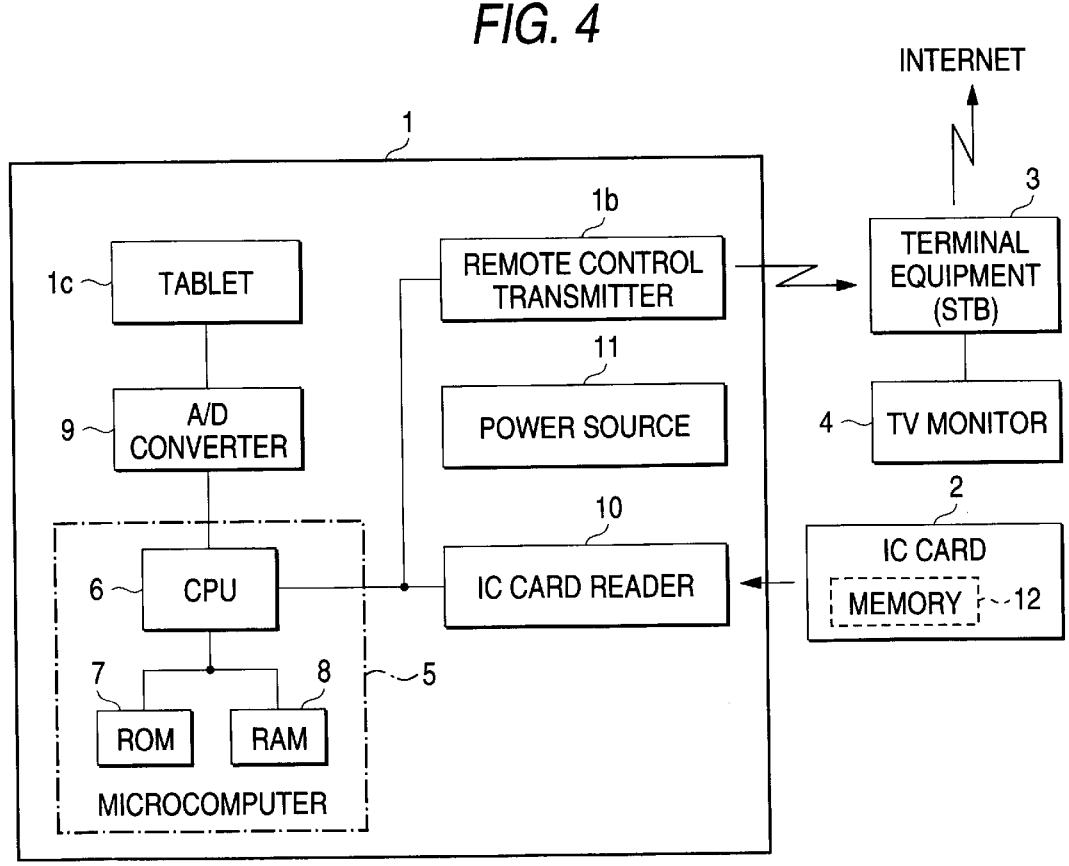
FIG. 4 is a block diagram concretely showing the electric configuration of the remote control.

FIG. 4 is a block diagram concretely showing the electric configuration of the system shown in FIG. 1, particularly the remote control 1 and the same reference number is allocated to the same part as the part shown in FIG. 1. As shown in FIG. 4, a reference number 5 denotes a microcomputer that controls the whole remote control and the microcomputer includes CPU 6, ROM 7 and RAM 8. A reference number 9 denotes an A/D converter and the A/D converter converts voltage detected when the tablet 1c is pressed and the resistance value varies to a digital value and outputs it to the CPU 6. The remote control transmitter 1b described above and the IC card reader 10 composing a reader are connected to the CPU 6. A reference number 11 denotes a power source that supplies a direct voltage source to each block and 12 denotes a memory composing the chip 21 (see FIG. 3A) of the IC card 2.

FIG. 5 is a table showing contents of the memory 12 of the IC card 2. For the IC card 2, a dedicated IC card is prepared corresponding to a specific home page as a card for viewing a home page of a department store A, a card for viewing a home page of a shop B and a card for viewing a home page of a company C for example and an URL address of a home page corresponding to a card is recorded in a code in the memory 12 of each IC card 2 as shown in FIG. 5. A key allocation program to determine what function is to be allocated to each key in case an item is selected on a home page by operating the key control panel on the tablet 1c is also stored in the memory 12.

These data are read by the IC card reader 10 when the IC card 2 is installed in the remote control 1 and is sent to the microcomputer 5. The microcomputer 5 stores the received data in RAM 8 and executes key allocation operation for the input of a key from the tablet 1c according to the key allocation program. The microcomputer 5 also reads the URL address from RAM 8, sends it to the remote control transmitter 1b and the remote control transmitter 1b transmits this URL address to the terminal equipment 3.

Next, a concrete example in case a home page is viewed using the system according to the invention will be described. A case that the IC card 2a shown in FIG. 2A is set in the remote control 1 and a home page of a department store is viewed will be described as the example. FIG. 7 shows a plan of the remote control 1 in which the card is set. Marks 20 composed of six letters printed on the surface of the IC card 2a appear on the tablet 1c of the remote control 1 as a key control panel. A viewer operates this remote control 1 in hand.

When the IC card 2a is set in the remote control 1, information shown in FIG. 5 stored in the memory 12 of the IC card is read by the IC card reader 10 as described above and an URL address is transmitted from the remote control transmitter 1b to the terminal equipment 3. A key allocation program is also downloaded to RAM 8. When the terminal equipment 3 receives the URL address, it accesses to a server (not shown) corresponding to the URL address via the Internet and acquires the information of a home page from the server. This information is supplied to the TV monitor 4 and the home page shown in FIG. 8A for example is displayed on the screen 4a of the TV monitor 4.

Figure 8A:
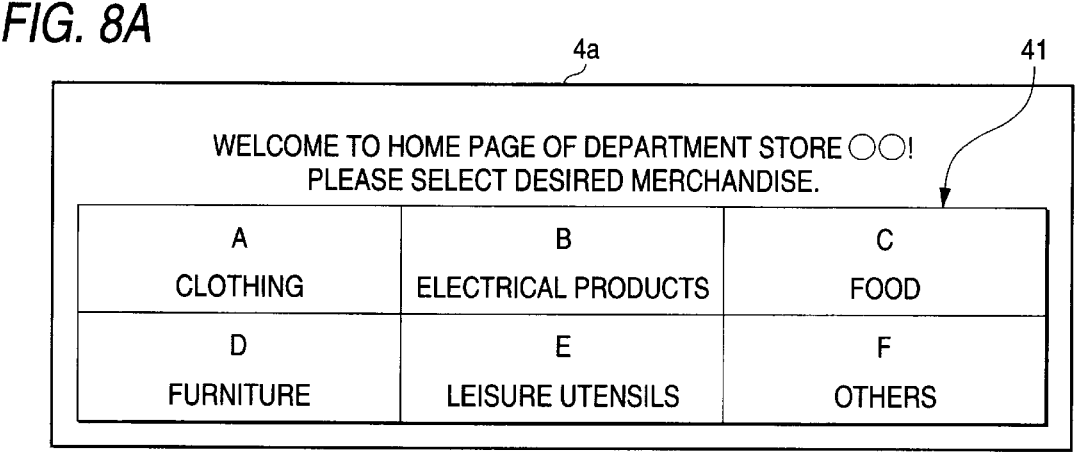
FIGS. 8A to 8C show examples of the screen on which a home page is displayed.
Figure 8B:
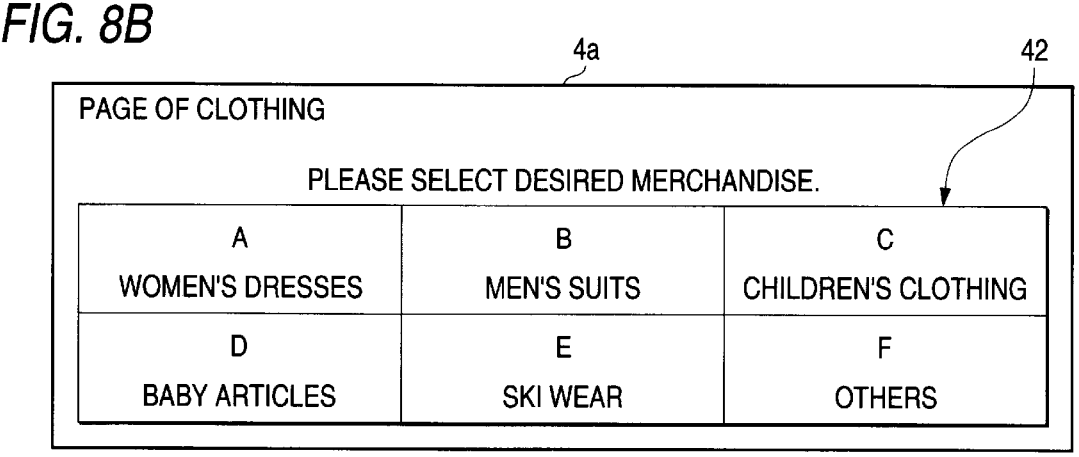

The key control panel 41 composed of six merchandise selection buttons of A to F is displayed on the screen 4a shown in FIG. 8A and the description of the corresponding merchandise is added to each key. The key control panel 41 is displayed in the same display mode as that of the key control panel that appears on the tablet 1c of the remote control 1 as clear in comparison with the key control panel shown in FIG. 7. In case a viewer tries to select a button A to view a page of closing on the screen 4a, he/she presses a key A of the remote control 1. A function corresponding to the home page shown in FIG. 8 is allocated to the key A by the program and when the terminal equipment 3 receives a key code sent from the remote control transmitter 1b based upon the pressure of the key A, it interprets that the button A is selected on the screen 4a, executes signal processing, acquires the information of the page of closing from the server and switches the current screen 4a to the page of closing shown in FIG. 8B. A key control panel 42 on this screen is also displayed in the same display mode as the key control panel of the remote control 1.

Next, in case a viewer selects a button B to view a page of men's suits on the screen shown in FIG. 8B, he/she presses a key B of the remote control 1. As predetermined allocation is also performed to the key B by the program, the terminal equipment 3 interprets that the button B is selected on the screen 4a, executes signal processing, acquires the information of the page of men's suits from the server and switches the current screen 4a to the page of men's suits shown in FIG. 8C when the terminal equipment 3 receives a key code sent from the remote control transmitter 1b based upon the pressure of the key B. A key control panel 43 on the screen is also displayed in the same display mode as that of the key control panel of the remote control 1.

Figure 8C:
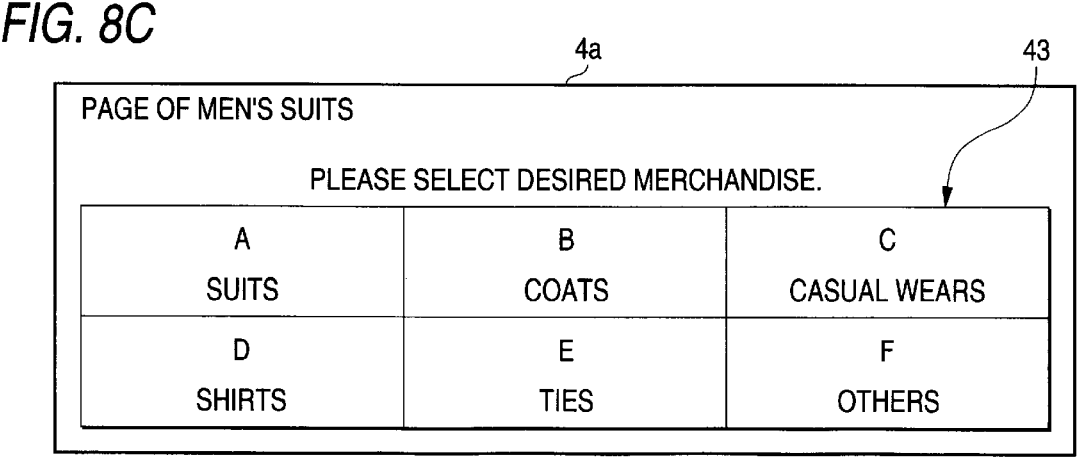

Similarly, in case a button C is selected on the screen shown in FIG. 8C, a key code corresponding to a key C is transmitted to the terminal equipment 3, the terminal equipment 3 acquires the information of the page of a casual wear from the server and displays this on the screen 4a (not shown) when the key C of the remote control 1 is pressed.

As described above, the key control panels 41 to 43 are displayed in the same display mode as that of the key control panel of the remote control 1 on the screen 4a, pages are hierarchically switched by pressing a key of remote control 1 corresponding to a predetermined button of the key control panels 41 to 43 and a new page can be displayed. In this case, as the arrangement of the buttons on the screen 4a and the arrangement of the keys on the tablet 1c of the remote control 1 completely correspond, the operation to select a button is very easy. As a cursor is not required to be moved for selection in the invention though it is required in a conventional type remote control, even a user who is unaccustomed to a remote control can operate promptly and securely.

In the example, the key control panels 41 to 43 of all the screens 4a are displayed in the same display mode as that of the key control panel of the remote control 1, however, this is not necessarily indispensable for the invention. Another display example of a home page will be described below. FIG. 9 shows a plan of the remote control 1 in which an IC card dedicated to a home page of a securities company is set. Keys composed of letters and a symbol printed on the surface of the card are shown on the tablet 1c, a reference number 20a denotes a menu key for the inquiry of a stock price and the sales of a stock, 20b denotes a scroll key for scrolling the contents of a home page upward or downward and 20c denotes an enter key for determining the sales of a stock.

When an IC card is set in the remote control 1, the URL address of a securities company stored in the memory 12 of the IC card is transmitted to the terminal equipment 3. Also, a key allocation program is downloaded into RAM 8 of the remote control 1 from the IC card. The terminal equipment 3 accesses to a server corresponding to the received URL, acquires the information of the home page of the securities company from the server and displays the home page shown in FIG. 10A on the screen 4a of the TV monitor 4. On this home page, a menu button 40a is displayed corresponding to the menu key 20a shown in FIG. 9, a scroll button 40b is displayed corresponding to the scroll key 20b, an enter button 40c is displayed corresponding to the enter key 20c and the respective buttons are displayed in the same display mode as that of the key control panel shown in FIG. 9.

Next, when a viewer operates the menu key 20a for the inquiry of a stock price of the remote control 1 to view a page for the inquiry of stock prices, a key code corresponding to the key is transmitted to the terminal equipment 3. The terminal equipment 3 decodes the key code, interprets that the button for the inquiry of a stock price is selected, executes signal processing, acquires the information of the page for the inquiry of a stock price from the server and switches the current screen 4a to the screen shown in FIG. 10B. On this screen 4a, the stock price of each designer-name merchandise is displayed in a list as shown in 10B and the screen is not displayed in the same display mode as that of the key control panel shown in FIG. 9. To scroll the screen 4a shown in FIG. 10B upward or downward, the scroll key 20b shown in FIG. 9 is operated.

Figure 11:
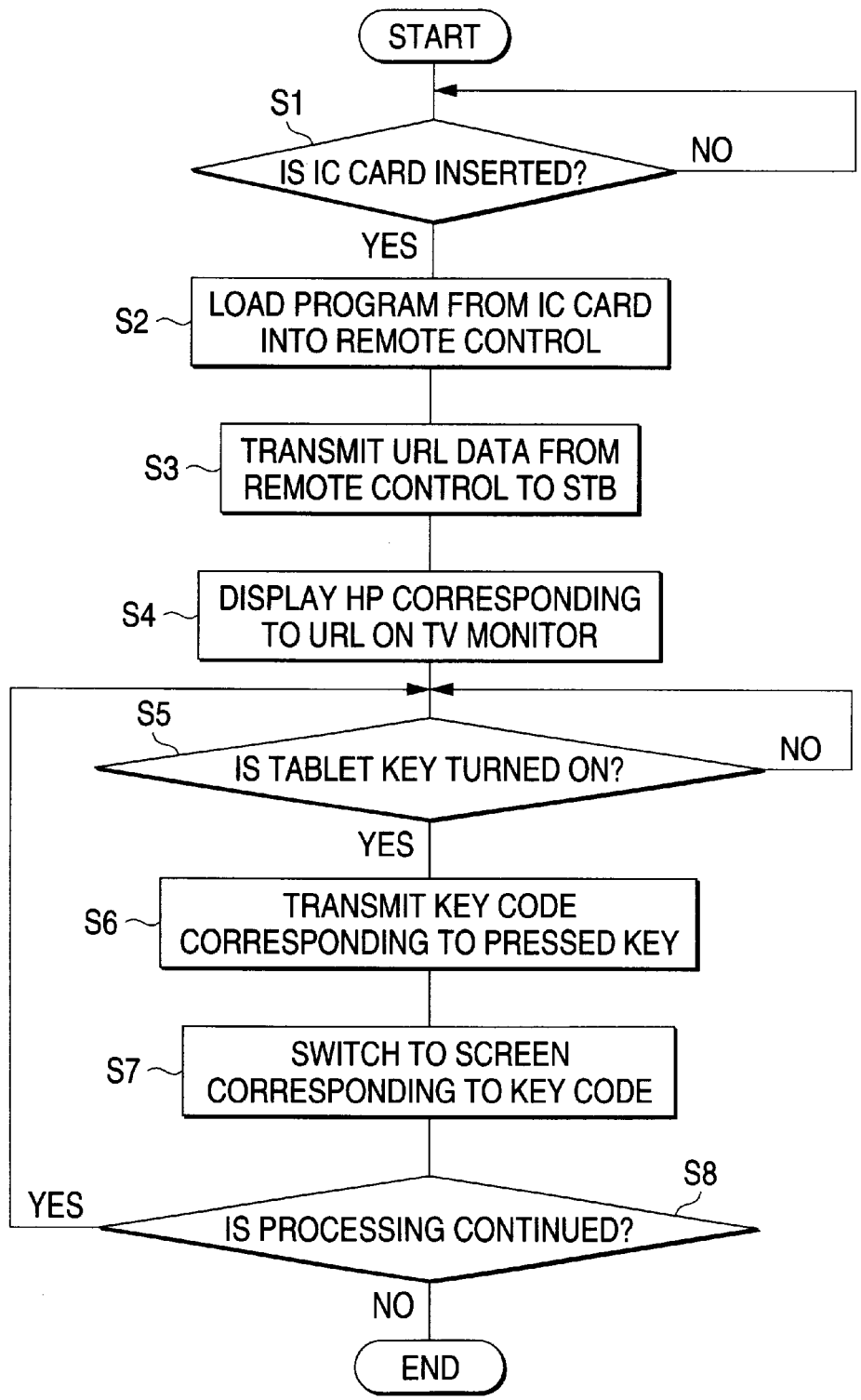
FIG. 11 is a flowchart showing a procedure for viewing a home page.

FIG. 11 is a flowchart showing a procedure for viewing a home page described above. First, it is discriminated by the microcomputer 5 whether the IC card 2 is inserted from the card slot 1d of the remote control 1 or not (a step S1). In case the IC card 2 is not inserted, the insertion is awaited (NO in the step S1), in case the IC card 2 is inserted (YES in the step S1), information stored in the memory 12 of the card is read by the IC card reader 10 and a key allocation program is downloaded into RAM 8 (a step S2). Also, the code of an URL address read from the memory 12 is transmitted from the remote control transmitter 1b to the terminal equipment 3 (a step S3). When the terminal equipment 3 receives the URL address, it accesses to a server of the Internet, acquires the information of a home page from the server and transmits this to the TV monitor 4. As a result, the home page corresponding to the URL address is displayed on the TV monitor 4 (a step S4).

Next, the microcomputer 5 discriminates whether a key of the tablet 1c is pressed or not based upon output from the A/D converter 9 (a step S5). In case no key is pressed, pressure is awaited (NO in the step S5) and in case a key is pressed (YES in the step S5), a key code corresponding to the key is transmitted from the remote control transmitter 1b to the terminal equipment 3 (a step S6). The terminal equipment 3 decodes the received key code and switches the screen of the TV monitor 4 depending upon a function allocated to the key (a step S7). Afterward, it is discriminated based upon the on-off state of the power switch 1e for example whether the view of the home page is continued or not (a step S8), in case it is continued (YES in the step S8), processing is returned to the step S5 and the steps S5 to S7 are executed and in case the view is not continued (NO in the step S8), the operation is terminated.

In the embodiment, the IC card is used for an information storage medium, however, an information storage medium according to the invention is not limited to this and a magnetic card and an optical IC card may be also used. However, in the case of a magnetic card, as information capacity which can be stored on a magnetic stripe is limited, it is practically impossible to record a program for allocating a key. Then, it is conceivable that in case the storage capacity of a card is small as described above, an identification code is recorded in the card and a program corresponding to the identification code is stored on the side of the remote control. Needless to say, in the case of an IC card, such a method may be also adopted.

FIGS. 6 show an embodiment in this case, FIG. 6A shows data stored in a memory 22 (including a magnetic stripe) of a card and in the memory 22, the URL address of a home page corresponding to the card and the identification code of the card are stored. Also, FIG. 6B shows data stored in ROM 7 (may be also RAM 8) of a remote control 1 and a key allocation program dedicated to a home page corresponding to each card is stored corresponding to each identification code. Only an identification code is recorded in a card and the URL address may be also recorded in the ROM 7 of the remote control 1 corresponding to the identification code together with the program.

Figure 12:
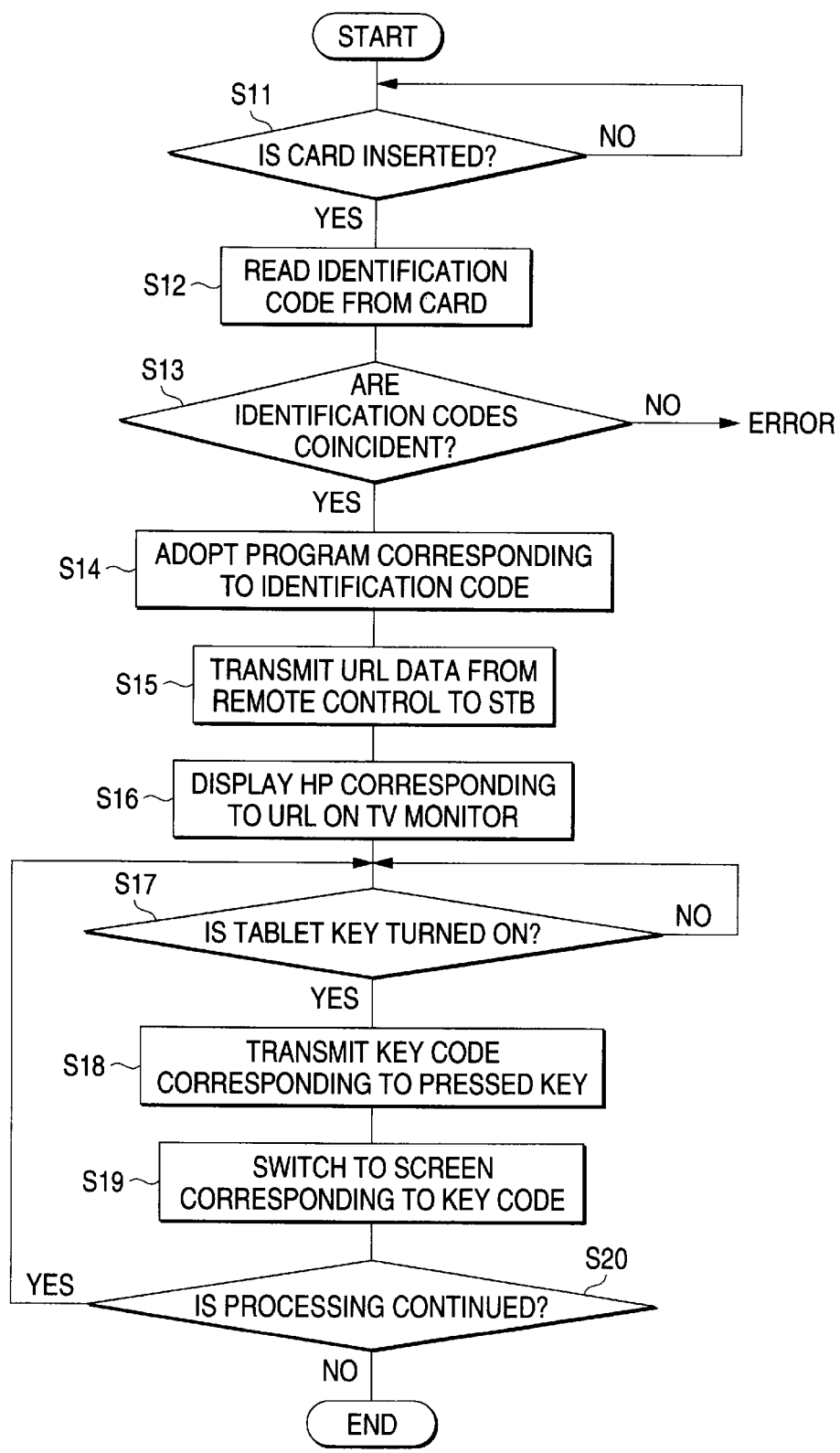
FIG. 12 is a flowchart in another embodiment.

FIG. 12 is a flowchart showing a procedure for viewing a home page in case the embodiment shown in FIG. 6 is adopted. First, it is discriminated by a microcomputer 5 whether a card is inserted or not (a step S11). In case no card is inserted, the insertion is awaited (NO in the step S11) and in case a card is inserted (YES in the step S11), an URL address and an identification code stored in the memory 22 of the card are read by a card reader (a step S12) and it is determined whether the identification code is coincident with an identification code recorded in ROM 7 or not (a step S13). In case the identification codes are not coincident, that is, in case the read identification code cannot be found in identification codes recorded in ROM 7 (NO in the step S13), error processing is executed. In the meantime, in case the identification codes are coincident (YES in the step S13), a key allocation program corresponding to the identification code is adopted (a step S14).

The following procedure is the same as that of the case shown in FIG. 11. That is, the read URL address is transmitted to terminal equipment 3 (a step S15), the terminal equipment 3 acquires the information of a home page from a server corresponding to the URL address and displays this on a TV monitor 4 (a step S16). Next, it is discriminated whether a key on a tablet 1c is pressed or not (a step S17), in case the key is pressed (YES in the step S17), a key code corresponding to the key is transmitted to the terminal equipment 3 (a step S18). The terminal equipment 3 decodes the key code and switches the screen of the TV monitor 4 (a step S19). Afterward, it is discriminated whether the view is continued or not (a step S20), in case it is continued (YES in the step S20), processing is returned to the step S17 and in case the view is not continued (NO in the step S20), the operation is terminated.

In the embodiments, the case that one URL address is recorded for one card is given as the example, however, plural URL addresses maybe also recorded for one card. In this case, the card has only to be composed so that different URL addresses are read depending upon a direction in which the card is inserted or the surface or the back of the card for example.

According to the invention, a desired home page can be easily opened by operation in hand without going to the location of the terminal equipment to replace cards. Also, as keys of the data transmitter are allocated as a key specific to a home page corresponding to a card, the data transmitter can be treated as the dedicated remote control of an individual home page and the operation is greatly simplified.

[FIG. 1]
1: REMOTE CONTROL
2: IC CARD
3: TERMINAL EQUIPMENT
4: TV MONITOR
A: THE INTERNET

[FIG. 4]
1b: REMOTE CONTROL TRANSMITTER
1c: TABLET
2: IC CARD
3: TERMINAL EQUIPMENT
4: TV MONITOR
5: MICROCOMPUTER
9: A/D CONVERTER
10: IC CARD READER
11: POWER SOURCE
12: MEMORY
A: THE INTERNET

[FIG. 5]
A: URL ADDRESS
B: KEY ALLOCATION PROGRAM

[FIG. 6A]
A: URL ADDRESS
B: IDENTIFICATION CODE

[FIG. 6B]
A: IDENTIFICATION CODE
B: PROGRAM

[FIG. 8A]
P: WELCOME TO HOME PAGE OF DEPARTMENT STORE OO!
Q: PLEASE SELECT DESIRED MERCHANDISE
A: CLOSING
B: ELECTRICAL PRODUCTS
C: FOOD
D: FURNITURE
E: LEISURE UTENSILS
F: OTHERS

[FIG. 8B]
P: PAGE OF CLOSING
Q: PLEASE SELECT DESIRED MERCHANDISE
A: WOMEN'S DRESSES
B: MEN'S SUITS
C: CHILDREN'S CLOSING
D: BABY ARTICLES
E: SKI WEAR
F: OTHERS

[FIG. 8C]
P: PAGE OF MEN'S SUITS
Q: PLEASE SELECT DESIRED MERCHANDISE
A: SUITS
B: COATS
C: CASUAL WEARS
D: SHIRTS
E: TIES
F: OTHERS

[FIG. 9]
A: INQUIRE STOCK PRICE
B: SELL
C: BUY
20c: DETERMINE

[FIG. 10A]
P: oo SECURITIES COMPANY HOME PAGE
A: INQUIRE STOCK PRICE
B: SELL
C: BUY
40c: DETERMINE

[FIG. 10B]
P: INQUIRY OF STOCK PRICE
Q: NAME
R: CLOSING PRICE
S: NET
T: SALES AMOUNT
U: COMPANY

[FIG. 11]
S1: IS IC CARD INSERTED?
S2: LOAD PROGRAM FROM IC CARD INTO REMOTE CONTROL
S3: TRANSMIT URL DATA FROM REMOTE CONTROL TO STB
S4: DISPLAY HP CORRESPONDING TO URL ON TV MONITOR
S5: IS TABLET KEY TURNED ON?
S6: TRANSMIT KEY CODE CORRESPONDING TO PRESSED KEY
S7: SWITCH TO SCREEN CORRESPONDING TO KEY CODE
S8: IS PROCESSING CONTINUED?

[FIG. 12]

S11: IS CARD INSERTED?

S12: READ IDENTIFICATION CODE FROM CARD

S13: ARE IDENTIFICATION CODES COINCIDENT?

S14: ADOPT PROGRAM CORRESPONDING TO IDENTIFICATION CODE

S15: TRANSMIT URL DATA FROM REMOTE CONTROL TO STB

S16: DISPLAY HP CORRESPONDING TO URL ON TV MONITOR

S17: IS TABLET KEY TURNED ON?

S18: TRANSMIT KEY CODE CORRESPONDING TO PRESSED KEY

S19: SWITCH TO SCREEN CORRESPONDING TO KEY CODE

S20: IS PROCESSING CONTINUED?

What is claimed is:

1. A home page display system comprising:

terminal equipment connected to the Internet;

a data transmitter that transmits data to said terminal equipment by remote control;

an information storage medium installed in said data transmitter to be detachable; and a display that displays a home page based upon data which said terminal equipment receives from said data transmitter, wherein:

plural marks showing a key control panel are provided on the surface of said information storage medium, and information for specifying a specific home page displayed on said display and information for allocating the plural marks as a key corresponding to the corresponding home page are stored in said information storage medium; and said data transmitter is provided with a transparent tablet where the marks of said installed information storage medium appear as the key control panel, reads the information stored in said information storage medium, allocates the marks that appear on said tablet as a key corresponding to a specific home page, transmits the URL address of the specific home page to said terminal equipment and transmits a key code corresponding to an operated key.

2. The home page display system according to claim 1, wherein:

said information storage medium is an IC card; and the URL address of the specific home page and a program for allocating the plural marks printed on the surface of a card as a key corresponding to the specific home page are stored in a memory.

3. The home page display system according to claim 2, wherein:

said data transmitter is provided with an IC card reader that reads information stored in an installed IC card; and the program is downloaded into the data transmitter via the IC card reader.

4. The home page display system according to claim 1, wherein:

an identification code corresponding to a specific home page is stored in said information storage medium;

a program for allocating the plural marks as a key corresponding to the specific home page is stored in said information storage medium; and said data transmitter reads the identification code of said information storage medium and allocates the keys according to a program corresponding to the identification code.

5. The data transmitter in a remote control system used in said home page display system according to claim 1 comprising:

a slot into which an information storage medium is inserted;

a transparent tablet where marks on said information storage medium inserted into the slot appear as a key control panel;

a reader that reads information recorded in said information storage medium; means for allocating marks that appear on said tablet as a key corresponding to the specific home page based upon information read by said reader; and a transmitter that transmits the URL address of the specific home page and a key code corresponding to an operated key.

6. A home page display system comprising:

terminal equipment connected to the Internet;

a data transmitter that transmits data to said terminal equipment by remote control;

an information storage medium installed in said data transmitter to be detachable; and a display that displays a home page based upon data which said terminal equipment receives from said data transmitter, wherein:

plural marks showing a key control panel are provided on the surface of said information storage medium, and information for specifying a specific home page displayed on said display and information for allocating the plural marks as a key corresponding to the corresponding home page are stored in said information storage medium;

said data transmitter is provided with a transparent tablet where the marks of said installed information storage medium appear as the key control panel, reads the information stored in said information storage medium, allocates the marks that appear on said tablet as a key corresponding to a specific home page, transmits the URL address of the specific home page to said terminal equipment and transmits a key code corresponding to an operated key; and the display mode of a key control panel that appears on said tablet of said data transmitter and the display mode of a key control panel for a home page displayed on said display are the same.

* * * * *

UNITED STATES PATENT AND TRADEMARK OFFICE
CERTIFICATE OF CORRECTION

PATENT NO. : 6,738,047 B2
DATED : May 18, 2004
INVENTOR(S) : Hideo Kobayashi

It is certified that error appears in the above-identified patent and that said Letters Patent is hereby corrected as shown below:

Title page,
Item [*] Notice, delete the phrase "by 180 days" and insert -- by 294 days --

Signed and Sealed this

Fifth Day of April, 2005

JON W. DUDAS
*Director of the United States Patent and Trademark Office*